United States Patent [19]
Latham et al.

[11] Patent Number: 5,368,342
[45] Date of Patent: Nov. 29, 1994

[54] MISALIGNMENT FLANGE AND METHOD FOR USE

[75] Inventors: Raymond E. Latham; Charles R. Mynheir, both of Houston, Tex.

[73] Assignee: Reflange, Inc., Houston, Tex.

[21] Appl. No.: 927,614

[22] Filed: Aug. 7, 1992

[51] Int. Cl.$^5$ .................. F16L 27/053; F16L 27/06
[52] U.S. Cl. .................. 285/261; 285/334.1; 285/334.4; 277/100; 277/169
[58] Field of Search .................. 285/261, 334.1, 334.4, 285/350; 277/30, 169, 100, 207 A; 29/434

[56] References Cited

U.S. PATENT DOCUMENTS

| | | | |
|---|---|---|---|
| 261,141 | 7/1882 | Dibble . | |
| 664,291 | 12/1900 | Reniff | 285/261 |
| 866,061 | 9/1907 | Phillips | 285/113 |
| 1,154,937 | 9/1915 | Robertson | 285/266 |
| 1,326,939 | 1/1920 | Knudsen | 285/269 |
| 2,931,672 | 4/1960 | Merritt et al. | 285/334.4 |
| 3,663,043 | 5/1972 | Walton | 285/113 |
| 3,712,645 | 1/1973 | Herter | 285/167 |
| 3,759,550 | 9/1973 | Peress | 285/263 |
| 3,997,197 | 12/1976 | Marsh et al. | 285/93 |
| 4,214,763 | 7/1980 | Latham | 285/167.5 |
| 4,379,559 | 4/1983 | Bohman | 277/207 A |
| 4,840,409 | 6/1989 | Welkey | 285/261 |
| 5,160,176 | 11/1992 | Gale | 285/261 |

FOREIGN PATENT DOCUMENTS

| | | | |
|---|---|---|---|
| 650786 | 10/1937 | Germany | 285/261 |
| 187549 | 10/1956 | Germany | 285/261 |
| 854641 | 11/1960 | United Kingdom . | |

*Primary Examiner*—P. Austin Bradley
*Assistant Examiner*—Jeffrey T. Knapp
*Attorney, Agent, or Firm*—Fish & Richardson

[57] ABSTRACT

An improved misalignment flange and method for use is provided by a socket member having a substantially spherical inside diameter surface seat which engages, in fluid-tight fashion, a ball member having a substantially spherical outside diameter surface and associated therewith a stored-energy seal. A retaining member is also utilized to clamp the ball member and spherical seal into fluid-tight engagement with the inside spherical surface of the socket member. The misalignment flange of the present invention provides up to 20° of off-axis misalignment and service in hostile environments.

22 Claims, 5 Drawing Sheets

MISALIGNMENT FLANGE AND METHOD FOR USE

BACKGROUND OF THE INVENTION

1. Field of the Invention

The present invention relates generally to an improved misalignment flange for connecting two misaligned conduits in fluid-tight communication, and more specifically relates to an improved ball and socket misalignment flange that utilizes a stored-energy seal to ensure fluid-tight communication.

2. Description of the Related Art

It is common in the oil production and refining industries to utilize a ball and socket type flange to join two misaligned pipe ends. These prior art ball and socket flanges have found application in both above-sea environments and sub-sea environments.

U.S. Pat. No. 664,291 discloses a universal pipe coupling utilizing a ball and socket arrangement for the metallic connection of air pipes or steam pipes between railway cars.

U.S. Pat. No. 3,997,197 discloses a ball and socket pipe coupling for connecting the ends of two pipes which are axially misaligned.

Both of these prior art inventions are representative of the attempts made to provide a fluid-tight, ball and socket flange for coupling misaligned pipes. However, each attempt has experienced certain drawbacks such as a high degree of mechanical complexity and therefore fabrication costs, and inferior sealing abilities, especially in high pressure, high temperature, and/or corrosive environments.

Accordingly, the present invention overcomes these and other limitations of prior art misalignment flanges by providing a ball and socket type misalignment flange that utilizes a stored-energy seal for fluid-tight communication between the pipes under high pressure, high temperature and corrosive environments.

SUMMARY OF THE INVENTION

The present invention consists of a misalignment flange comprising a socket member having a substantially spherical inside surface seat. A ball member is provided that has a substantially spherical outside surface for engaging the substantially spherical inside surface of the socket member. One end of the ball member has a seal seat. Also provided is a seal member having a first sealing surface for sealing engagement with the end of the ball member adapted to receive the seal member, a second sealing surface for sealing engagement with the substantially spherical inside surface of the socket member and a retainer member for holding the socket member, the ball member and the seal member in fluid-tight engagement.

In another embodiment of the present invention, a method is provided for joining two misaligned pipes in fluid-tight communication, which comprises joining a first pipe to one end of a socket member which has a substantially spherical inside surface. Next, a second pipe is joined to one end of a ball member having a substantially spherical outside surface for engaging the substantially spherical inside surface of the socket member and the ball member having the other end adapted to receive a seal member. Further, the seal member having first and second sealing surfaces is engaged with the ball member and the socket member, the first sealing surface in sealing engagement with the end of the ball member adapted to receive the seal member and the second sealing surface in sealing engagement with the substantially spherical inside surface of the socket member. Finally, a retainer member is applied to the ball member to hold the socket member, the ball member, and the seal member in a misaligned arrangement in fluid-tight engagement.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENT

Figure 1:
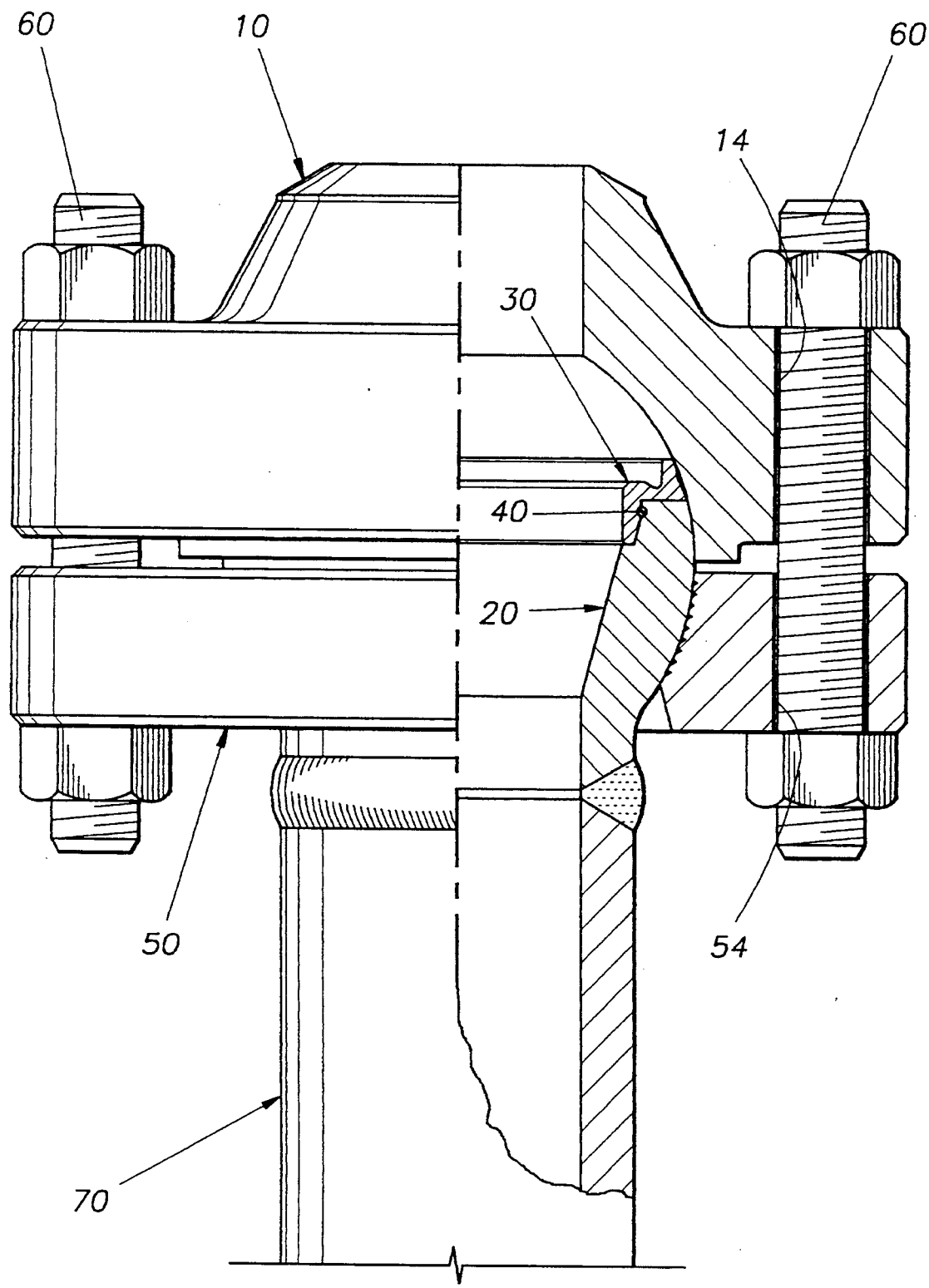
FIG. 1 shows a partial section of an assembled misalignment flange according to the present invention.

The preferred embodiment of the present invention is disclosed in FIG. 1. The misalignment flange 1, as shown in FIG. 1, comprises a socket member 10, a ball member 20, a stored-energy seal 30, a seal positioner 40, a retainer member 50, and flange fasteners 60. Also shown in FIG. 1 is pipe end 70.

Figure 2:
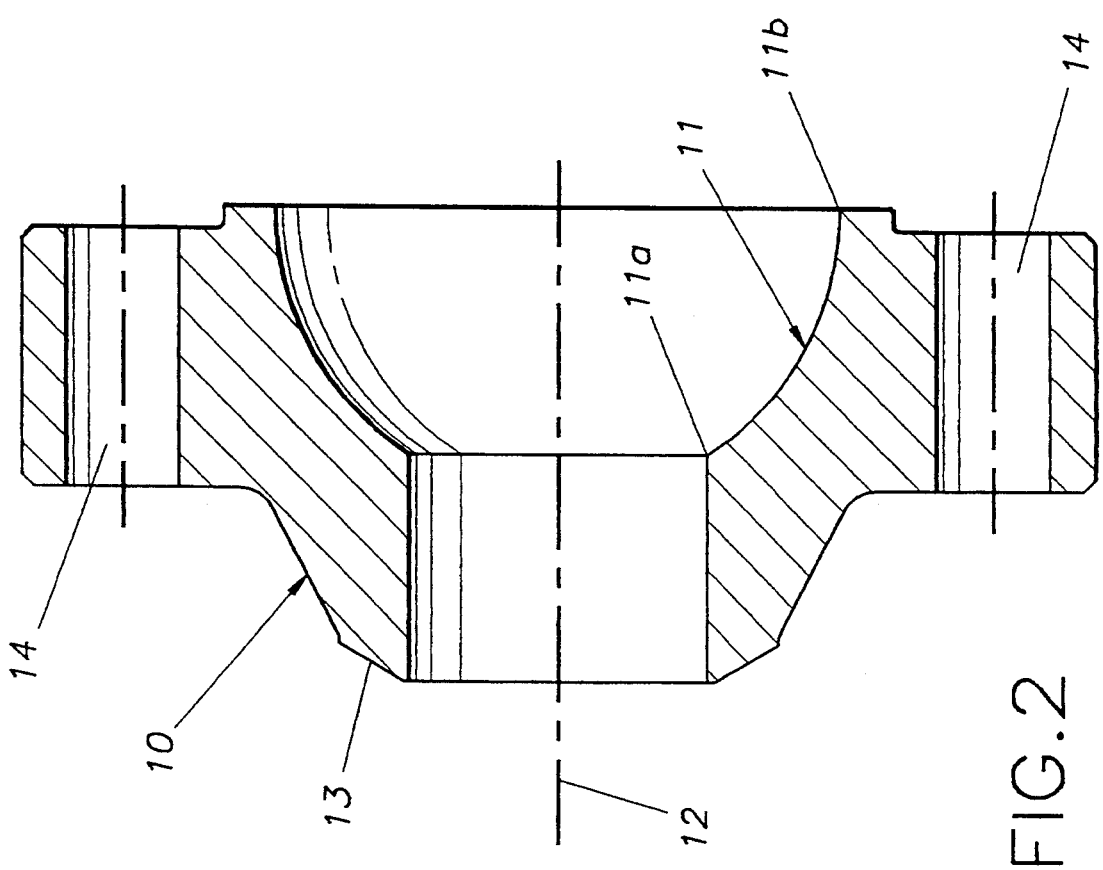
FIG. 2 is a sectioned view of the socket member of the present invention.

Shown in more detail in FIG. 2 is the socket member 10. Spherical seat 11 is a spherical surface formed about the center line 12 of the socket member 10. It should be noted that although FIG. 2 indicates that the spherical seat 11 extends from point 11a to point 11b, this is not required by the present invention. The spherical seat 11 need only cover that portion of the socket member 10 upon which the spherical seal surface 34 (not shown in FIG. 2) will react during the range of alignment of the misalignment flange.

At the end of the socket member opposite the end with the spherical seat 11, there is a means for joining the socket member 10 to a pipe end (not shown in FIG. 2). The specific joining means shown in FIG. 2 is a beveled end connection for welding the socket member 10 to a pipe end. There are a number of other joining means that will suffice to join the socket member 10 to a pipe end, such as, a bolted connection, a brazed joint, a threaded joint, or other joints known to those of ordinary skill in the art. Those of ordinary skill in the art having the benefit of this disclosure will readily appreciate that the joining means 13 will be selected based on a number of design operating criteria such as ease of joining, integrity of the joint, ability to repair or replace the joint, and other such concerns. Also shown in FIG. 2 are passageways 14 to accommodate flange fasteners 60.

Figure 3:
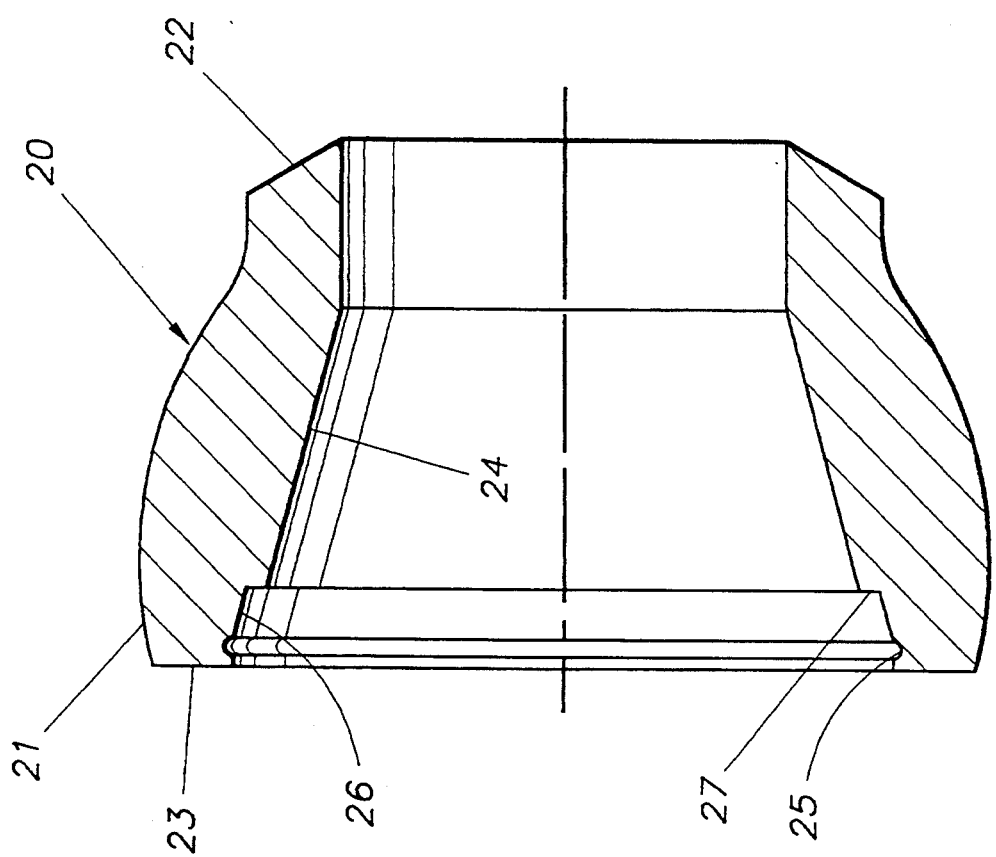
FIG. 3 is a sectioned view of the ball member of the present invention.

FIG. 3 shows a sectioned view of the ball member 20. The outside diameter surface 21 of ball member 20 is substantially spherical and of a dimension such that it will fit within the spherical seat 11 of socket member 10. Ball member 20 has a means for joining 22 at one end.

Again, as discussed with respect to the socket member 10 of FIG. 2, the specific joining means disclosed in FIG. 3 is a beveled end for welding. However, those of ordinary skill in the art having benefit of this disclosure will appreciate that there are a number of other means for joining that will suffice.

A support end 23 is seen opposite the end of the ball member 20 which contains the joining means 22. Adjacent the support end 23, but on the inside surface 24 of the ball member 20, is a seal positioner groove 25 and a ball member seat 26. Ball member seat 26 is frusto-conical in shape and tapers inwardly from its end adjacent support end 23 at an angle "$\Theta_{26}$". Angle $\Theta_{36}$ is preferably in the range of 15° to 20°.

Figure 4:
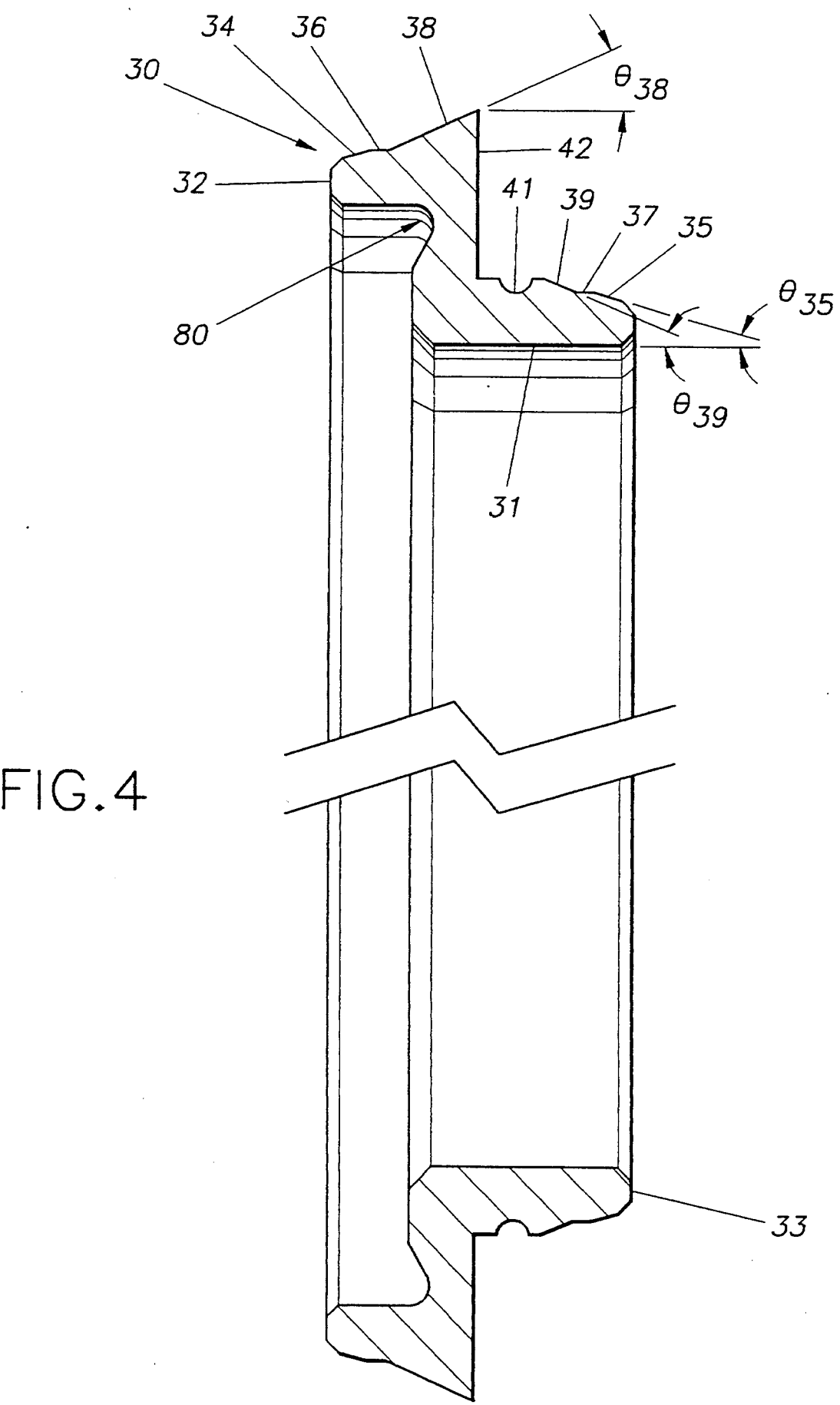
FIG. 4 is a sectioned view of the stored-energy seal of the present invention.

FIG. 4 shows a sectioned view of the stored-energy seal 30 of the preferred embodiment. Seal 30 generally comprises an inner cylindrical surface 31 and annular end surfaces 32 and 33 at opposite ends thereof. The external sealing surface 34 of stored-energy seal 30 is generally spherical in shape corresponding to the spherical seat 11 of socket member 10. Spherical sealing surface 34 is separated from frusto-conical taper surface 38 by cylindrical relief ring 36. Relief ring 36 isolates the sealing surface 34 from the taper surface 38.

Sealing surface 35 is generally frusto-conical in shape tapering outwardly from end surface 33 at angle "$\Theta_{35}$." Angle "$\Theta_{35}$" is preferably less than taper angle "$\Theta_{26}$" by approximately $\frac{1}{2}$°. This minimal angular differentiation augments the sealing capabilities of surface 35. Alternately, angle "$\Theta_{35}$" may be substantially the same as angle "$\Theta_{26}$". Sealing surface 35 is separated from frusto-conical taper surface 39 by cylindrical relief ring 37. Taper surfaces 38 and 39 are generally frusto-conical in shape and taper at angles "$\Theta_{38}$" and "$\Theta_{39}$", respectively. In the preferred embodiment, angles "$\Theta_{38}$" and "$\Theta_{39}$" are greater than angles "$\Theta_{26}$" and "$\Theta_{35}$" as measured from the center line axis of the stored-energy seal 30.

Alternatively, the taper angles "$\Theta_{38}$" and "$\Theta_{39}$" of the taper surfaces 38 and 39 may be at substantially the same taper angle "$\Theta_{35}$" as the sealing surface 35. Still further, it is not absolutely necessary that the taper angle "$\Theta_{38}$" be the same as the taper angle "$\Theta_{39}$", although in the preferred embodiment they are substantially the same.

Seal 30 also includes a seal positioner groove 41 similar to the seal positioner groove 25 shown in FIG. 3 with respect to the ball member. The seal also includes face 42 and undercut 80. Undercut 80 aids the elastic deformation of the seal as will be discussed below.

Referring now to FIGS. 2, 3, 4, and 4a, it will be appreciated that the stored-energy seal member 30 is designed such that it will mate with both ball member 20 and socket member 10 to form a fluid-tight connection. The seal 30 is inserted onto the ball member 20 such that sealing surface 35 engages ball member seat 26. As can be seen from FIG. 4a, at initial installation only a small portion of sealing surface 35, e.g., line contact, engages ball member seat 26. Annular end surface 33 is adjacent, but does not contact ball member face 27. In the preferred embodiment there is a 0.005" gap between end surface 33 and face 27. This gap enhances the deflection of the sealing surfaces 34 and 35 as will be discussed more fully below.

Support face 42 engages ball member seal end 23. A seal positioner 40, such as an elastomeric O-ring, snap-ring or a circular coiled spring, is located in the toroidal cavity formed by seal positioner groove 25 and seal positioner groove 41. This seal positioner provides no fluid-tight sealing function but rather serves to locate the stored-energy seal 30 against the ball member 20 during installation and completion of the misalignment flange 1.

Figure 4A:
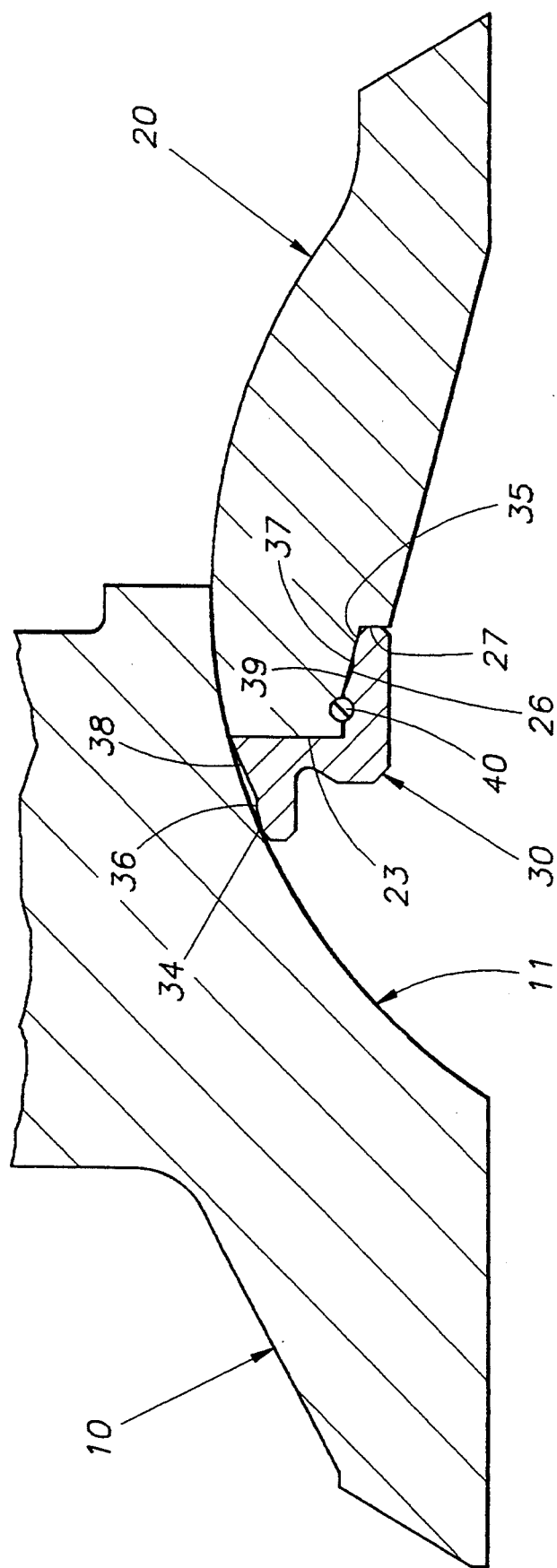
FIG. 4a is a sectioned view of the socket member, seal, and ball member in position.

It will be appreciated by those of ordinary skill in the art that once the seal member 30 has been positioned on the ball member 20 with the aid of the seal positioner 40, sealing surface 34 and taper surface 38 extend beyond the ball member seal end 23 as shown in FIG. 4a. The ball member 20 with stored-energy seal 30 attached is designed to fit inside the socket member 10 such that spherical sealing surface 34 and taper surface 38 of seal 30 engage spherical seat 11 of socket member 10. On initial installation, only a small portion of sealing surface 34, e.g., line contact, will engage the spherical seat 11 as shown in FIG. 4a.

Seal 30 is described as a stored-energy seal because the seal is elastically deformed during flange make-up. This elastic deformation provides stored energy to maintain the integrity of the fluid tight seal. As pointed out above, during initial make-up, sealing surfaces 34 and 35 just contact seats 11 and 26, respectively. During flange make-up, full surface contact between sealing surface 34 and seat 11, and between sealing surface 35 and seat 26 is realized. The sealing surfaces and taper surfaces on stored energy seal 30 cooperate to provide moment arms or levers for storing elastic deformation for energizing sealing surfaces 34 and 35.

It will be appreciated by those of ordinary skill in the art having benefit of this disclosure that the sealing area of surfaces 34 and 35, and also the area of taper surfaces 38 and 39, can be varied utilizing general design equations to maintain maximum contact pressure without appreciable plastic deformation.

Figure 5:
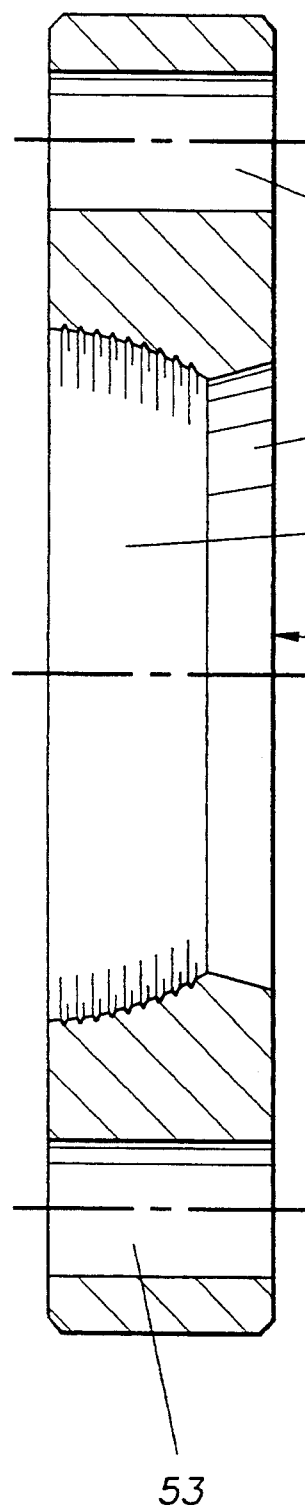
FIG. 5 is a sectioned view of the retainer member of the present invention.
Figure 6:
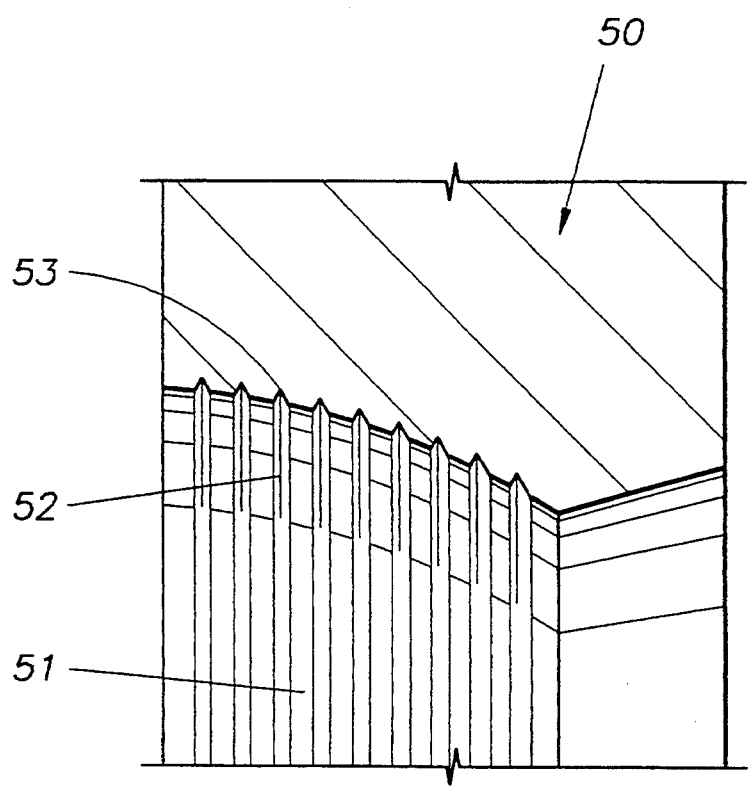
FIG. 6 is a close-up view of the retainer member illustrated in FIG. 5.

Referring now to FIGS. 5 and 6, FIG. 5 shows retainer member 50. Retainer member 50 is basically donut-like in shape with the inside surface 51 substantially spherical in shape. Inside surface 51 may contain gripping striations 52 for a static flange, or a polished or coated surface for a dynamic flange. FIG. 6 is an enlarged view of a section of retainer member 50 containing gripping striations 52. In the preferred embodiment of a static flange, the gripping striations 52 are formed by circumferential grooves 53.

Retainer member 50 is used, as shown in FIG. 1, to engage that portion of the outside diameter surface 21 of ball member 20 that is not engaged with socket member 10. This engagement, as will be described more fully below, forces the ball member/stored-energy seal assembly into fluid-tight engagement with socket member 10. For a static flange, the gripping striations 52 of retainer member 50 function to securely hold the ball member 20 at the correct orientation to align the two misaligned pipe ends. It will be appreciated by those of ordinary skill in the art having benefit of this disclosure, that the function served by gripping striations 52 can be accomplished by a variety of other structures such as hash marking, checkering, or some other structure suitable to increase the surface roughness, and therefore the friction, of this portion of retainer member 50.

For a dynamic flange, the retainer member inside surface 51 is preferably coated with a ceramic material such as Tungsten carbide to prevent galling of the surfaces and to facilitate dynamic realignment of the flange during service.

The preferred embodiment of retainer member 50 as shown in FIG. 5 also includes passageways 54. When the misalignment flange 1 is in its assembled state as shown in FIG. 1, passageways 54 of retainer member 50 are in substantially collinear alignment with passageways 14 of socket member 10. As shown in FIG. 1, these passageways accept fasteners such as threaded studs or bolts for energizing the stored-energy seal by forcing the ball member/seal assembly into fluid tight engagement with socket member 10. Once energized, the fasteners also securely fasten the retainer member 50 to the socket member 10. Although not shown in FIG. 1, those of skill in the art will appreciate that the retainer member 50 can be secured to the socket member 10 (and the ball member/seal assembly energized) by any number of fastening mechanisms, such as, a threaded connection, a welded connection, a locking-cam connection, or a clamp/hub connection.

In addition, retainer member 50 also includes angled surface 55. Angled surface 55 is necessary to allow the ball member 20 to be oriented off the centerline axis of the misalignment flange 1 in order to accommodate the misalignment of the pipe ends.

The preferred embodiment of the present invention will accommodate up to 20° of off-axis misalignment in any direction. Moreover, the novel design of the present invention allows for dry assembly of the component parts of the misalignment flange. That is, no grease or other lubricant is required during assembly. Further, depending upon the material from which the misalignment flange parts are manufactured, the present invention may be utilized in environments up to 1400° F.

The preferred material from which to manufacture the misalignment flange is that family of steels known as high strength, low alloy. Such steels are also known as chromemoly steels. However, the present invention is not limited to these materials. Any number of materials may be used such as nickel bearing alloys, structural steels, cast irons, and even plastics. It is presently preferred that all components, with the possible exception of the seal positioner 40 be manufactured from the same material. This is especially true in those environments where galvanic or dissimilar metal corrosion may be a problem. However, the present invention will also function where the component parts of the misalignment flange are fabricated from different materials. Specifically, the stored-energy seal 30 quite often may be manufactured from a different material. The present invention also contemplates the use of ceramic materials for coating the spherical seat 11 of the socket member 10 and the ball member seat 26 of ball member 20.

In practice, the present invention provides a quick and relatively simple solution to connecting misaligned pipe ends in fluid-tight engagement, both dynamically and statically. Typically, the first step in utilizing the present invention is to fasten socket member 10 to one pipe end that is sought to be connected in fluid-tight engagement. As discussed previously, the joint between the socket member 10 and the pipe end is facilitated by joining means 13. In the preferred embodiment, the joint is facilitated by beveled surfaces which are then welded to, preferably, beveled surfaces on the pipe end. Next, depending upon the demands of the given application, the ball member 20 will be joined to the second pipe end with the aid of joining means 22. Once the socket member 10 and the ball member 20 are securely joined to the respective pipe ends, the seal positioner 40 may be installed in the seal position groove 25 on inside diameter surface 24 of ball member 20. Next, the seal 30 can be engaged with the ball member 20 as detailed above.

Now the ball member/seal assembly is ready to be mated with the spherical seat 11 of the socket member 10.

Once the misalignment flange 1 is in proper alignment, the retainer member 50 can be passed over the second pipe end to contact the joining means 22 side of the ball member 20. In the preferred embodiment, flange fasteners 60 are utilized in conjunction with passageways 14 and 53 to firmly clamp the ball member/seal assembly into the socket member 10. This clamping force provides the necessary pressure for elastic deformation of the sealing surfaces on the seal 30 thereby energizing the stored-energy seal. This provides fluid-tight communication between the two joined, but misaligned pipe ends.

The foregoing disclosure is sufficient to enable one of ordinary skill in the art to practice the present invention. Further, the foregoing disclosure provides the best mode of practicing the present invention presently known to the inventors. However, it will be appreciated by those of ordinary skill in the art having the benefit of this disclosure that there are various modifications that may be made to the present invention without departing from the scope of the present invention.

What is claimed is:

1. A misalignment flange comprising:
    a socket member having a substantially spherical inside surface with a spherical seal seat;
    a ball member having a substantially spherical outside surface for engaging the substantially spherical inside surface of said socket member, one end of said ball member having an inwardly facing seal seat;
    a seal having a first sealing surface for sealing engagement with said ball member seal seat, a second sealing surface for sealing engagement with said socket member seal seat;
    a seal positioner disposed between said inwardly facing seal seat and the seal for locating the seal on said ball member; and
    a retainer member for holding said socket member, said ball member and said seal in fluid-tight engagement.

2. The misalignment flange of claim 1, further comprising means for fastening said retainer member to said socket member to hold said misalignment flange in fluid-tight connection.

3. The misalignment flange of claim 1, wherein said seal positioner is an elastomeric O-ring.

4. The misalignment flange of claim 1, wherein said seal positioner is a coiled spring.

5. The misalignment flange of claim 1, wherein said seal positioner is a snap-ring.

6. The misalignment flange of claim 1, further comprising means for joining said socket member to a first pipe end, and means for joining said ball member to a second pipe end.

7. The misalignment flange of claim 1, wherein said second sealing surface of said seal is a substantially spherical surface.

8. The misalignment flange of claim 7, wherein said first sealing surface is a frusto-conical surface, and said ball member seat is a frusto-conical surface.

9. A misalignment flange comprising:
    a socket member having a substantially spherical inside surface with a spherical seal seat;

a ball member having a substantially spherical outside surface for engaging the substantially spherical inside surface of said socket member, one end of said ball member having a frusto-conical seal seat:

a seal having a first frusto-conical sealing surface for sealing engagement with said ball member seal seat, a second sealing surface for sealing engagement with said socket member seal seat, a first frusto-conical taper surface separated from said first sealing surface by a first relief ring, and a second frusto-conical taper surface which is separated from said second sealing surface by a second relief ring; and a retainer member for holding said socket member, said ball member and said seal in fluid-tight engagement.

10. The misalignment flange of claim 9, wherein said angle of said frusto-conical ball member seal seat is between 15° and 20°.

11. The misalignment flange of claim 10, wherein said angle of said first sealing surface is substantially the same as the angle of said ball member seal seat.

12. The misalignment flange of claim 10, wherein said the angle of said first sealing surface is approximately $\frac{1}{2}$° less than the angle of said ball member seal seat.

13. The misalignment flange of claim 10, wherein said angle of said first frusto-conical taper surface is greater than or equal to the angle of said ball member seal seat which is greater than or equal to the angle of said first sealing surface.

14. The misalignment flange of claim 10, wherein the angle of said first frusto-conical taper surface is substantially the same as the angle of said ball member seal seat which is substantially the same as the angle of said first sealing surface.

15. A misalignment flange for fluid-tight communication between two misaligned pipes comprising:

a socket member having a substantially inside surface with a substantially spherical seal seat, one end of said socket member having a means for joining said socket member to a first pipe;

a ball member having a substantially spherical outside surface for engaging the substantially spherical inside surface of said socket member, one end of said ball member having a means for joining said ball member to a second pipe, and the other end of said ball member having a frusto-conical seal seat;

a seal having a frusto-conical sealing surface for fluid-tight sealing engagement with the frusto-conical ball member seal seat, a first frusto-conical taper surface separated from said frusto-conical sealing surface by a first relief ring, a substantially spherical sealing surface for fluid tight engagement with the substantially spherical socket member seal seat, a second frusto-conical taper surface separated from said substantially spherical sealing surface by a second relief ring means for positioning said seal member on said ball member; and a retainer member for fixedly engaging the outside surface of said ball member, said retainer member adapted to hold said socket member, said ball member and said seal member in fluid-tight engagement.

16. The misalignment flange of claim 15, wherein said angle of said frusto-conical ball member seat is between 15° and 20°.

17. The misalignment flange of claim 16, wherein said angle of said frusto-conical first sealing surface is substantially the same as the angle of said frusto-conical ball member seat.

18. The misalignment flange of claim 17, wherein said angle of said frusto-conical first sealing surface is approximately $\frac{1}{2}$° less than the angle of said frusto-conical ball member seat.

19. The misalignment flange of claim 17, wherein the angle of said first frusto-conical taper surface is greater than or equal to the angle of said frusto-conical ball member seat which is greater than or equal to the angle of said first frusto-conical sealing surface.

20. The misalignment flange of claim 17, wherein the angle of said first frusto-conical taper surface is substantially the same as the angle of said frusto-conical ball member seat which is substantially the same as the angle of said first frusto-conical sealing surface.

21. The misalignment flange of claim 17, wherein the substantially spherical inside surface seal seat of said socket member is ceramic coated.

22. A method for joining two misaligned pipes in fluid-tight communication, comprising the steps of:

joining a first pipe to a socket member having a substantially spherical inside surface with a seal seat;

joining a second pipe to one end of a ball member having a substantially spherical outside surface for engaging the substantially spherical inside surface of the socket member, said ball member having a an inwardly facing seal seat adjacent the other end;

engaging a seal member having a first sealing surface and a second sealing surface with said ball member and said socket member, said first sealing surface in sealing engagement with said inwardly facing seal seat, said second sealing surface in sealing engagement with said substantially spherical inside surface seal seat;

installing a seal positioner between said inwardly facing seal seat and said seal for locating said seal on said ball member; and applying a retainer member to said socket member, said retainer member holding said socket member, said ball member, and said seal member in said misaligned arrangement in fluid-tight engagement.

* * * * *

UNITED STATES PATENT AND TRADEMARK OFFICE
CERTIFICATE OF CORRECTION

PATENT NO. : 5,368,342

DATED : November 29, 1994

INVENTOR(S) : Raymond E. LATHAM et al.

It is certified that error appears in the above-identified patent and that said Letters Patent is hereby corrected as shown below:

Column 3, line 13, replace "$\Theta_{36}$" with --$\Theta_{26}$--.

Column 7, line 38, insert --spherical-- after "substantially."

Signed and Sealed this

Fourth Day of April, 1995

Attest:

BRUCE LEHMAN

Attesting Officer

Commissioner of Patents and Trademarks